United States Patent [19]

Pickles

[11] 4,043,529

[45] Aug. 23, 1977

[54] SEAT ADJUSTING MECHANISM

[75] Inventor: Joseph Pickles, Birmingham, Mich.

[73] Assignee: Ferro Manufacturing Corporation, Detroit, Mich.

[21] Appl. No.: 733,998

[22] Filed: Oct. 20, 1976

[51] Int. Cl.² .......................................... F16M 11/24
[52] U.S. Cl. .................................... 248/419; 248/373; 297/346
[58] Field of Search ............... 248/419, 420, 421, 423, 248/373, 393, 395, 396, 394, 157; 297/346

[56] References Cited

U.S. PATENT DOCUMENTS

| 2,921,621 | 1/1960 | Williams et al. | 248/394 |
| 3,148,858 | 9/1964 | Harms | 248/419 |
| 3,368,840 | 2/1968 | Dangauthier | 248/420 |
| 3,669,398 | 6/1972 | Robinson | 248/421 |
| 3,692,271 | 9/1972 | Homier | 248/421 |

FOREIGN PATENT DOCUMENTS

| 2,238,154 | 2/1974 | Germany | 248/396 |
| 2,255,122 | 5/1974 | Germany | 248/393 |
| 410,523 | 4/1945 | Italy | 248/419 |
| 396,279 | 1/1974 | U.S.S.R. | 248/421 |

Primary Examiner—Marion Parsons, Jr.
Attorney, Agent, or Firm—Whittemore, Hulbert & Belknap

[57] ABSTRACT

A manually operable four-way seat adjuster mechanism comprising a horizontally movable carriage assembly, and a seat assembly connected to said carriage by bell-cranks. The bell-cranks at each side of the carriage assembly are connected by links, at least one of which in turn is provided with notches, and a correspondingly notched latch lever retains the link in adjusted latched position. Torsion bars interconnect bell-cranks at opposite sides of the carriage, each comprising a rod extending through a closely fitted tube, the ends of which are fixed to the bell-cranks. The ends of the rods are flattened and fixed to opposite sides of the carriage. A strong balance spring assists the bell-cranks, and the geometry is such as to provide a substantially uniform lifting torque to the seat throughout its range of adjustment.

8 Claims, 7 Drawing Figures

SEAT ADJUSTING MECHANISM

DETAILED DESCRIPTION

Figure 1:
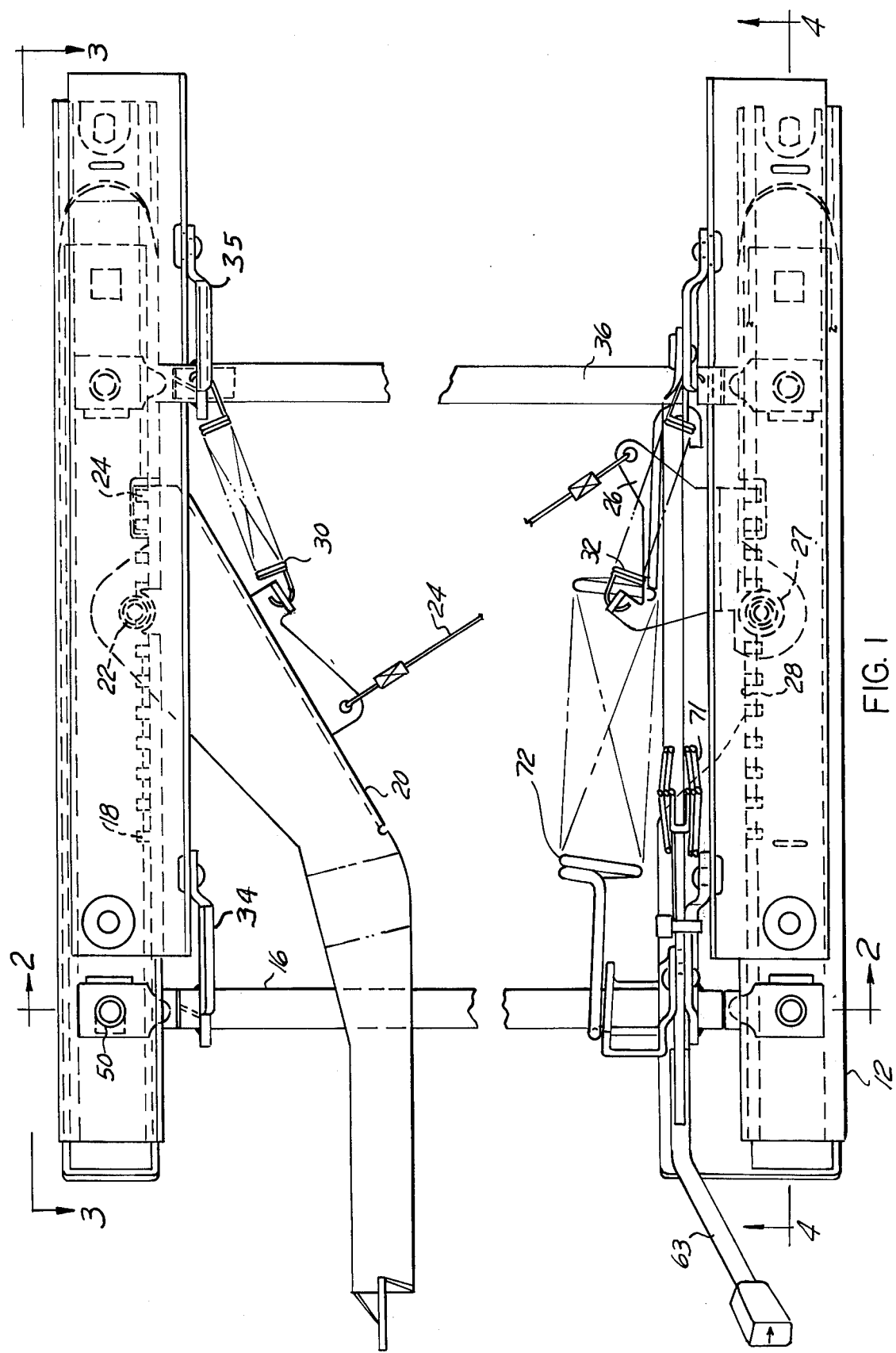
FIG. 1 is a plan view of the seat adjusting mechanism.
Figure 2:
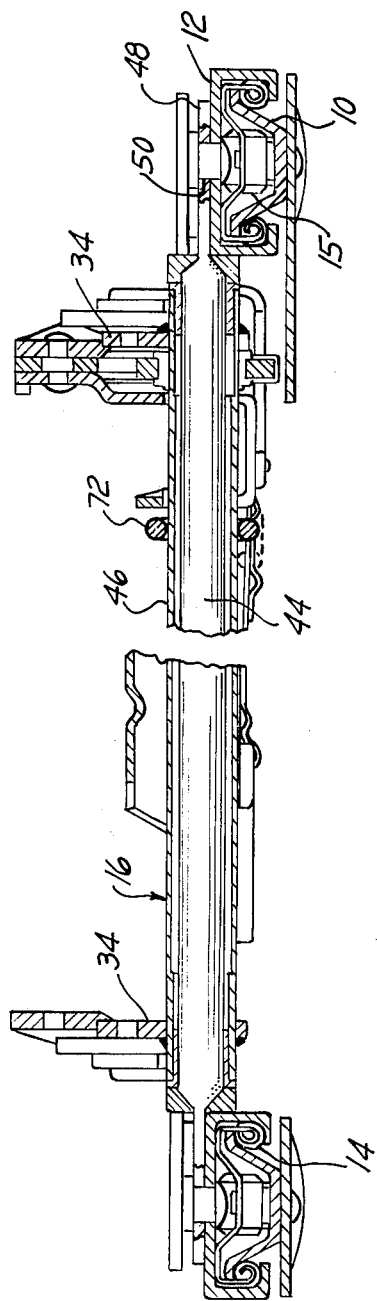
FIG. 2 is a sectional view on the line 2—2, FIG. 1.
Figure 4:
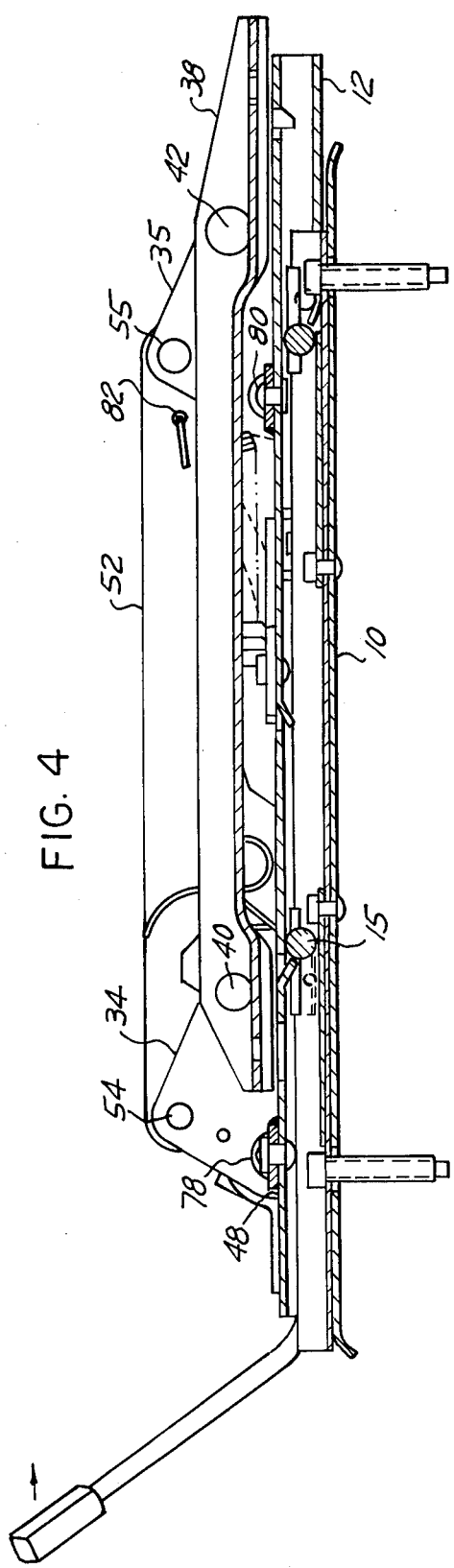
FIG. 4 is a sectional view on line 4—4, FIG. 1.
Figure 3:
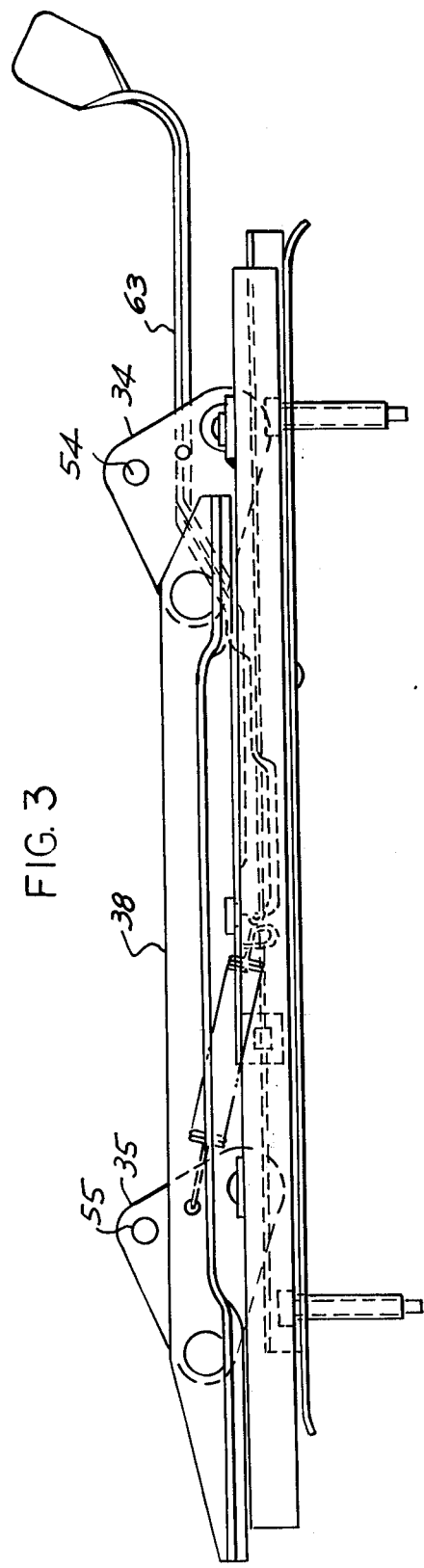
FIG. 3 is a side elevational view viewed from arrows 3—3, FIG. 1.

Referring now to the drawings, the entire seat construction is slidable fore and aft of a vehicle on fixed tracks 10, on which are slidable carriages 12, balls 14 being interposed to provide ease of adjustment. Carriages 12 are interconnected by torsion bar assemblies 16 which will be described in detail subsequently.

Latch means are provided for retaining the carriage assembly in adjust position and comprises stationary notched rail 18 cooperating with a latch lever 20 pivoted at 22 and including teeth 24 adapted to enter into the notches of rail 18. Lever 20 is connected by flexible link 24 to an auxiliary lever 26 having teeth pivoted at 27 and cooperating with a notched rail 28. Hand operated lever thus releases both sides of the carriage simultaneously. Lever biasing springs 30 and 32 retain the horizontal latching mechanism in latching position until released by the passenger.

Referring now particularly to FIGS. 1, 3, 4, 6 and 7, the mechanism for raising and lowering the seat will be described. The carriage assembly made up of carriages 12 and torsion bar assemblies 16 are provided with four bell-cranks, the front bell-crank at the left side of the seat being seen at 34 in FIGS. 4 and 5, and the rear bell-cranks at the same side being seen at 35. Seat support bars 38 are pivoted to links 34 and 35 at 40 and 42, respectively.

Bell-crank 34 is pivotally carried by the front torsion bar 16, and bell-crank 35 is carried by rear torsion bar 36.

Figure 5:
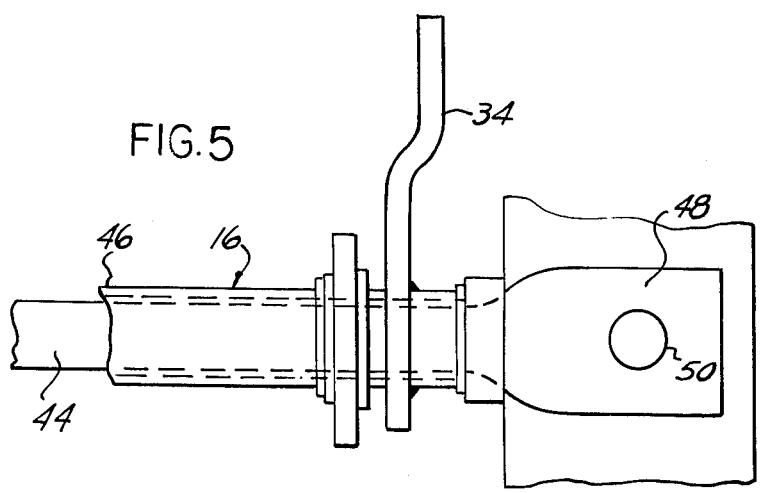
FIG. 5 is an enlarged plan view of one end of a torsion bar and bell-crank.
Figure 6:
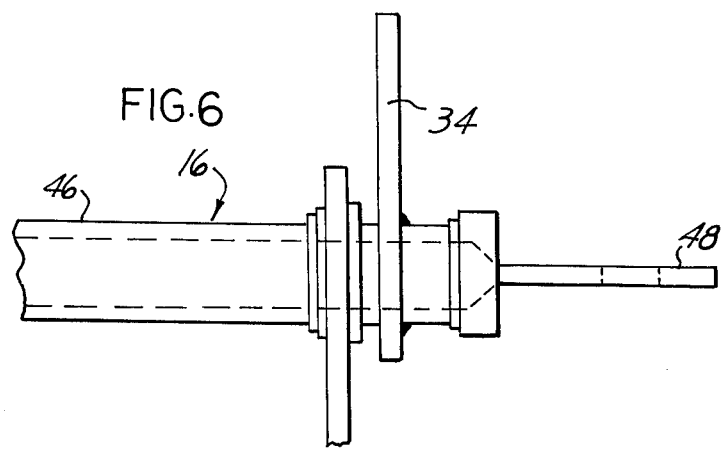
FIG. 6 is an elevational view of the structure of FIG. 5.

Referring now to FIGS. 5 and 6, the torsion bar assembly designated 16 in its entirety will be seen to comprise a cylindrical rod 44 received in a tube 46, the ends of the rod extending beyond the ends of the tube and being flattened as seen at 48. The flat ends of the rod are riveted or otherwise secured to the flat upper surface of the carriages as indicated at 50, thus forming an exceptionally rigid carriage assembly.

Tubes 46 are rotatable on rods 44 and the bell-cranks are welded to the tubes, the bell-crank 34 being so illustrated in FIGS. 5 and 6. Accordingly, the torsion bars, and particularly the rods 44, constitute pivot support on the carriage assembly for the four bell-cranks which raise and lower the seat frame including seat support bars 38.

Figure 7:
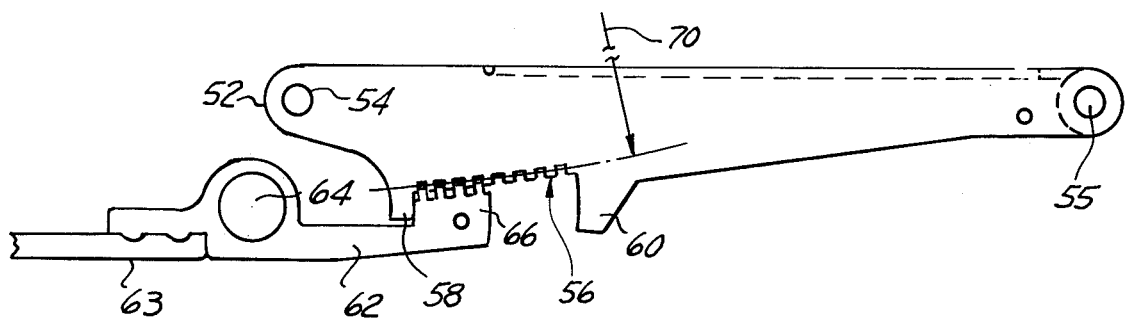
FIG. 7 is a detail view showing the co-action between a link connecting lifting bell-cranks, and the latch lever therefor.

The seat assembly is retained in adjusted position by latching structure best seen in FIG. 7. At each side of the vehicle seat the two bell-cranks 34 and 36 are interconnecting by a link 52 having pivot connections 54, 55 at its ends for connection to the bell-cranks to ensure equal swinging movement of the front and rear cranks.

The link 52 has a toothed lower edge as indicated at 56, between stops 58, 60.

A vertical latch lever 62 having an operating extension or handle 63 is pivoted at 64 to the carriage assembly and has a short toothed portion 66. It will be understood that as the seat is adjusted vertically, the height of the link 52 varies, and that the latch lever 62 accordingly has a different position about its pivot axis 64 for each position of seat height. In order to accommodate this, the toothed portion 56 of the link has is teeth formed on a curved pitch line, here indicated as the dot and dash line 68, which has a large radius of curvature 70 which for example may be about 20 inches.

Suitable resilient biasing means, such as torsion spring 71 is connected to lever 62 to bias it into latching position.

A strong tension spring 72 substantially counterbalances the weight of the passenger, and when the latch lever 62 is released, the passenger may move the seat to any desired position by appropriately pushing or pulling on the steering wheel.

One of the improved features of the present invention is the geometry of the bell-crank and the selection of the balance spring 72. The seat frame bars 38 are pivotally connected to the rear ends of the cranks by pivot connections 40 and 42 and these are arranged such that with the seat in its lowermost position, pivot connections 40 and 42 are substantially in the same horizontal plane as the pivot mountings 78 and 80 of the bell-cranks afforded by the torsion bar assemblies. The balance spring 72 is connected to links as shown at 82. With the seat in its lowermost position, spring 72 is at its greatest extension and exerts the maximum tension. As the seat moves upwardly, tension of the spring decreases, but the mechanical advantage of the lever arm between pivots 78 and 40, and between pivots 80 and 42, increases. This tends to maintain the lifting action of the balance spring 72 more uniform.

What I claim as my invention is:

1. A manually operable four-way vehicle seat adjusting mechanism comprising a pair of stationary tracks, elongated carriages movable longitudinally of said tracks, rigid torsion bars having cylindrical intermediate portions and flattened end portions fixedly connected at the flattened end portions to said carriages to provide a rigid carriage assembly, torsion tubes mounted on the intermediate portions of said bars and journaled thereby for rotation thereon, lifting bell-cranks fixed to said tubes adjacent their ends, links extending longitudinally between the bell-cranks at each side of said mechanism, and a seat frame including longitudinally extending rigid frame bars pivotally connected at their ends to the bell-cranks at each side of the mechanism.

2. A mechanism as defined in claim 1, in which the flattened end of said torsion bars have a width greater than the diameter of said torsion tubes, and in which the flattened end portions are welded to said carriage bars.

3. A mechanism as defined in claim 1, which comprises a lifting balance spring connected to one of said bell-cranks to bias said bell-crank in a direction to raise the seat frame connected thereto, said spring arranged to apply its maximum biasing force when said seat frame is in its lowermost position, said bell-cranks arranged to have lever arms applying increasing mechanical advantage as the seat is initially moved upwards from the lowermost position.

4. A mechanism as defined in claim 1, comprising a rigid link connecting the bell-cranks at one side of said mechanism, a series of latching teeth on a vertical side of said link, a latch lever pivoted to said carriage assembly having vertically extending teeth engageable with the teeth on said link to maintain said link and hence the bell-cranks connected thereto at a selected position of adjustment.

5. A mechanism as defined in claim 4, comprising resilient biasing means urging said latch lever in a direction to maintain the teeth of said link and latch lever in latching engagement.

6. A manually operable four-way vehicle seat adjusting mechanism comprising a pair of stationary tracks, a carriage assembly comprising a pair of lifting bell-cranks pivoted to said carriage at each side thereof, a seat assembly comprising an elongated carriage bar pivotally connected at its ends to said pair of bell-cranks, a link pivotally connected at its ends to similar pivot connections on said pair of bell-cranks, said link having a longitudinally extending series of latch teeth thereon, a latch lever pivoted to said carriage assembly having a series of latch teeth engageable with selected portions of the series of latch teeth on said link, and resilient means connected to said latch lever and biasing said latch in a direction to engage the teeth thereon with a selected portion of the teeth on said link.

7. A mechanism as defined in claim 6, in which the teeth on said link are arranged with their teeth on a curved pitch line to provide for full tooth engagement at different heights of the link from said carriage assembly.

8. A mechanism as defined in claim 6, in which the teeth on said link are on the underside thereof, and the teeth of said latch lever are on the upper side thereof.

* * * * *